DIRECT CURRENT COUPLED CONTRAST CONTROL

Filed Oct. 3, 1962

2 Sheets-Sheet 1

Inventor.
Louis W. Schreiner
By Hofgren, Brady, Wegner, Allen & Stellman
Attorneys.

Inventor.
Louis W. Schreiner.
By Hofgren, Brady,
Wegner, Allen & Stellman
Attorneys.

United States Patent Office 3,201,513

Patented Aug. 17, 1965

3,201,513

DIRECT CURRENT COUPLED CONTRAST CONTROL

Louis W. Schreiner, Palatine, Ill., assignor to Warwick Electronics Inc., a corporation of Delaware Filed Oct. 3, 1962, Ser. No. 228,125

5 Claims. (Cl. 178—7.5)

Figure 1:
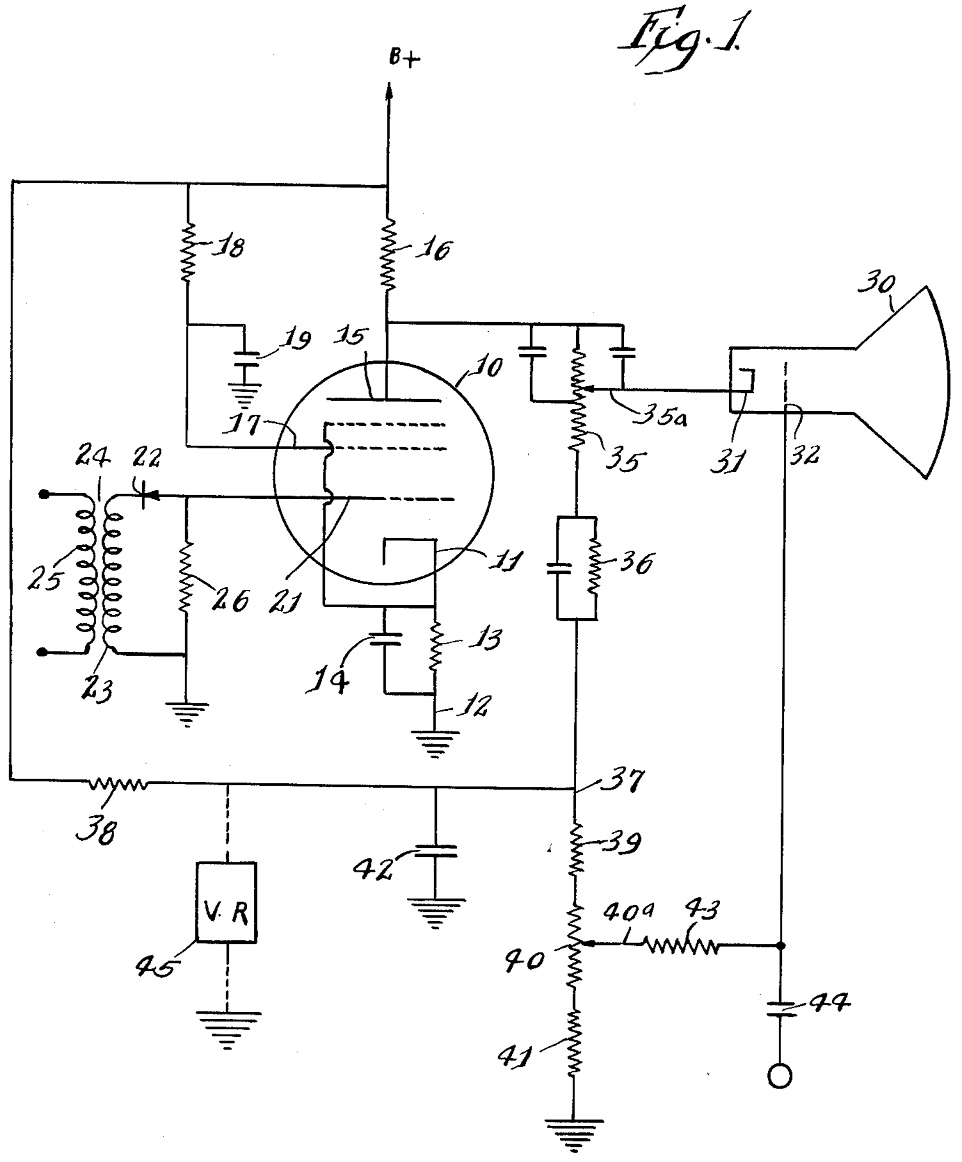

This invention is concerned with a television receiver and more particularly with a direct current coupled contrast control.

In a television signal, a direct current component is transmitted which establishes a suitable voltage level for application of the video to the cathode ray tube. This direct current signal determines the point of operation on the characteristic of the cathode ray tube so that the video signal will produce in the cathode ray tube a full range of picture content from black to white. If the cathode ray tube is operated at the wrong point in its characteristic curve, the quality of reproduction is poor as the display does not cover the full range of shading and is not linearly related with the received video signal. In a commonly used circuit, the video signal is applied to the cathode of the cathode ray tube through a direct coupled circuit from the anode of the video amplifier. A brightness potential is applied between a grid or accelerating electrode of the cathode ray tube and the cathode. The operating point of the cathode ray tube is thus dependent on the direct potential appearing at the plate of the video amplifier which varies with variations in the average black content of the received video signal.

If it is desired to use a contrast potentiometer of the lowest capacity and power rating in this circuit, it is necessary to return the low end of the potentiometer to a voltage source approximately equal (D.C. wise) to the D.C. voltage at the high end of the control to limit the direct current flow through the control and keep the control within power rating. In some circuits to accomplish this, the contrast potentiometer is connected between the anode and the screen grid of the video amplifier. Here, the direct current potential at each end of the contrast potentiometer varies in the same direction with the average picture content so regardless of the setting of the contrast control, full D.C. signal would always be applied to the picture tube cathode.

An object of this invention is the provision of an improved direct current connected contrast control for a television receiver in which the D.C. potential across the potentiometer is low and the A.C. and D.C. gain vary simultaneously with adjustment of the contrast control.

One feature of the invention is the provision of a circuit in which the contrast potentiometer is connected between the anode of the video amplifier and a point of stable operating potential as might be provided by a resistive voltage divider network connected across the operating potential source.

Another feature is that the brightness control potential is obtained from a potentiometer connected in said voltage divider.

A further feature is that a limiter resistor is connected between the contrast potentiometer and said point of stable operating potential, to limit the zero contrast conditions for the circuit.

Figure 2:
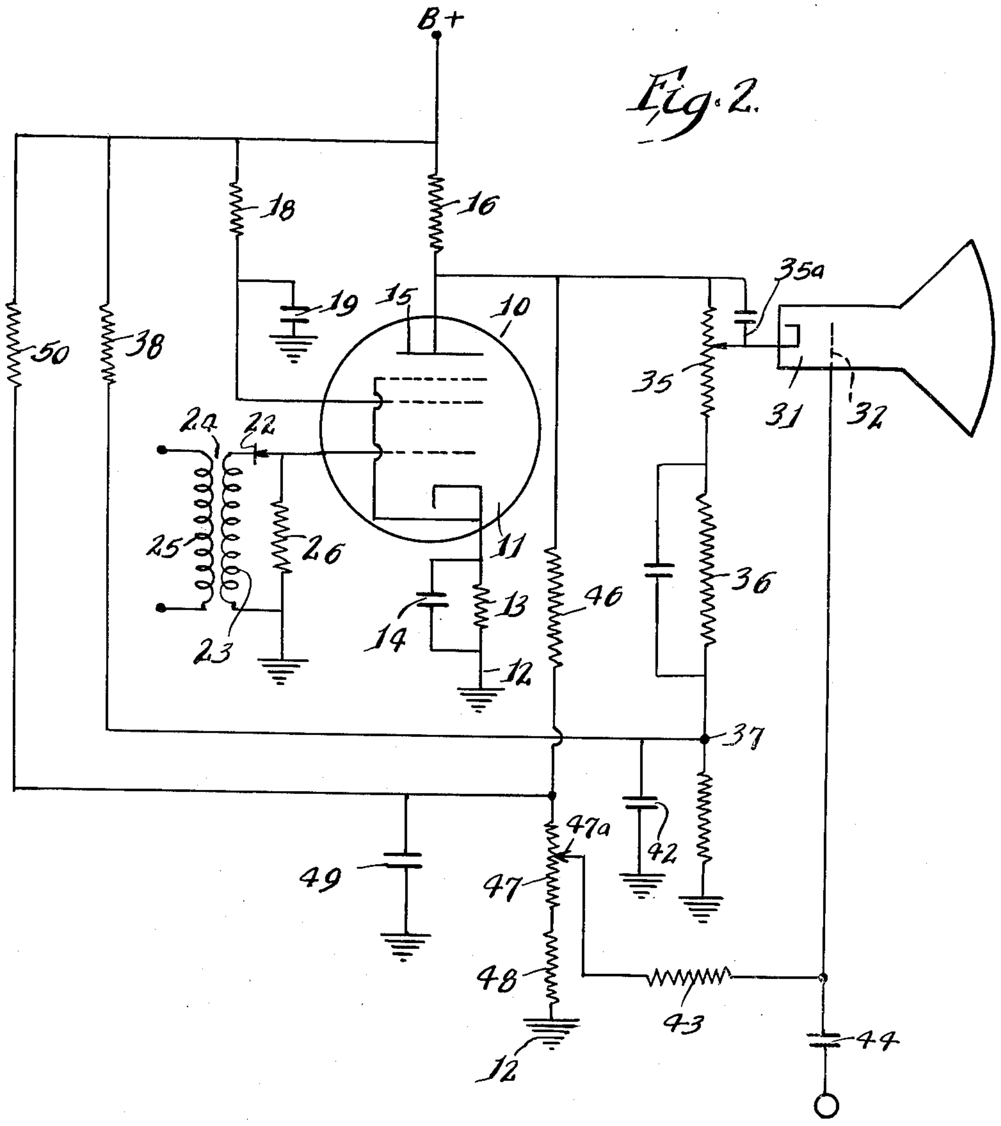

Other objects and advantages will become readily apparent from the following description taken in connection with the accompanying drawings, in which:

FIGURE 1 is a schematic diagram of a portion of a television receiver circuit embodying the invention; and FIGURE 2 is a schematic diagram of a modified form of the invention.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

During the course of the following description values will be assigned to the various components of the specific circuit discussed. It is to be understood that this specific disclosure is made solely for the purpose of illustrating an operative embodiment of the invention. The values of the various circuit elements are not critical unless otherwise specified. Many changes and modifications will be apparent to those skilled in the art. Only that portion of a television receiver which is pertinent to the invention is disclosed specifically. It will be understood that the receiver as a whole includes suitable radio frequency and intermediate frequency amplifier stages, sweep and synchronizing circuitry and an audio system.

Turning now to the drawing, FIGURE 1, a pentode amplifier 10, as the pentode section of an 8AW8, serves as a video amplifier for the television receiver. The amplifier 10 has a cathode element 11 returned to ground or reference potential 12 through a bias resistor 13, 15 ohms, bypassed by capacitor 14, 0.01 $\mu$f. The anode 15 is connected through a load resistor 16, 5600 ohms, with a source of positive operating potential or B+, of the order of 280 volts. The operating potential source is returned to the reference potential or ground 12. The screen grid element 17 of amplifier 10 is connected through resistor 18, 27,000 ohms, with B+ and is bypassed to ground through capacitor 19, 2 $\mu$f.

The input circuit for amplifier 10 is connected between the control grid 21 and cathode 11 and with a source of video signal. The circuit includes detector 22 connected with the secondary winding 23 of the coupling transformer 24. Primary winding 25 of the transformer may be connected in the output circuit of the final stage of the intermediate frequency amplifier of the receiver. Detector load resistor 26, 3300 ohms, is connected from the control grid to ground.

A cathode ray tube display device 30 has cathode and grid elements 31 and 32, respectively. It will be understood that suitable deflection circuitry and a high voltage source will be provided for the display device. Such circuitry is well known and forms no part of the invention.

Connected with the anode 15 of amplifier 10 is a contrast control potentiometer resistor 35, 30,000 ohms. To reduce power dissipation in the control so a small, low capacity control can be utilized, potentiometer resistor 35 is returned through a limiter resistor 36, 3900 ohms to a point 37 of relatively stable operating potential approximately equal to the D.C. anode potential. This reduces the D.C. potential across the control to a relatively low value thus reducing the power dissipation in the control due to D.C. The potential at point 37 is provided by a voltage divider connected across the B+ operating supply and including resistor 38, 22,000 ohms connected between B+ and point 37, and three serially connected resistors 39, 6800 ohms, 40, 10,000 ohms and 41, 22,000 ohms, to ground. Capacitor 42, 2 μf., is connected from point 37 to ground bypassing the point for video frequency signals.

The movable tap 35*a* of contrast control 35 is connected directly with the cathode 31 of the picture tube 30. Resistor 40 in the voltage divider serves as the brightness control and has a tap 40*a* connected through isolation resistor 43, 47,000 ohms with grid 32 of the picture tube. A negative pulse is applied to grid 32 from the vertical sweep circuitry through coupling capacitor 44, providing vertical retrace blanking.

The direct current potential on the plate 15 of amplifier 10 will change substantially with a variation of the content of the video signal. More specifically, in the circuit described, the D.C. plate voltage is of the order of 150 volts with a white picture and 200 volts with a black picture. The contrast control 35 is returned to the point 37 of stable operating potential, to provide a reference point for both A.C. and D.C. signals. This reference point is at a zero level or ground for A.C. signals except when the frequency becomes low enough so that the filtering due to bypass capacitor 42 becomes ineffective. The value of these resistors 39, 40 and 41 is determined by practical considerations of power consumption. The direct current gain of the circuit varies approximately in proportion to the alternating current gain as the setting of the contrast control is changed. The accuracy of this relation of the direct and alternating current gains depends on the interaction that occurs between the voltage at the point 37 and the D.C. voltage at the anode of the amplifier tube. The A.C. and D.C. gain could be made the same by the addition of a voltage regulator 45 from the point 37 to ground, as shown in broken lines.

In the absence of voltage regulator 45, the D.C. stability of reference point 37 is always poorer than the A.C. zero reference stability. This means that even if there is zero A.C. gain between the input and the point 37, some D.C. gain is still present so at minimum contrast the D.C. gain of the system will be greater than the A.C. gain.

Changes in brightness resulting from changes in the D.C. reference potential of point 37 can be reduced by obtaining the D.C. potential for picture tube grid 32 from the voltage divider between the point 37 and ground. Any change in the potential at the video amplifier anode causing a corresponding, but lesser change at point 37 will also cause a change at the potentiometer arm 40*a*. This latter change being applied to the picture tube grid 32 will have an effect on picture brightness opposite that due to changes on the picture tube cathode 31 applied through potentiometer arm 35*a*. This results in somewhat less unwanted brightness variation than would be present if the picture tube grid were returned to a separate divider from B+.

Another circuit in which the D.C. gain is equal to the A.C. gain regardless of the setting of the contrast control is shown in FIGURE 2. Here, a different means is provided for obtaining an operating voltage for the picture tube grid 32. Certain portions of FIGURE 2 are comparable with FIGURE 1 and the same reference numerals are used to indicate like elements. Reference numbers 46 through 50 represent additional components for this circuit. Resistors 46, 47, 48 and 50 form a divider network from the plate 15 of the video amplifier tube and from B+ to ground 12. Capacitor 49 is connected from the junction of resistors 46, 47 and 50 to ground and removes the video from the circuit so that only the D.C. component is applied to picture tube grid 32. Resistors 46, 47, 48 and 50 are selected so that when tap 47*a* is adjusted to give the right picture brightness, this point 47*a* has a D.C. excursion identical with that of point 37, with changes of picture content from black to white level. Thus, if the contrast were reduced to zero (picture tube cathode 31 tied to point 37) even though point 37 changes in level with D.C. picture content, point 47*a* changes level in a like manner and no D.C. (brightness) change will result.

I claim:

1. In a television receiver, a direct current coupled contrast control circuit of the character described, comprising: a video amplifier having cathode, control grid and anode electrodes; means establishing a reference potential; a source of operating potential positive with respect to said reference potential; means including an anode load connecting the anode-cathode circuit of said video amplifier between said source of operating potential and said reference potential; a voltage divider connected between said source of operating potential and said reference potential, having an intermediate point providing a stable operating potential less than the potential of said source; a video contrast control potentiometer having a resistor portion connected between said anode and said intermediate point; a brightness control potentiometer having a resistor portion connected in a voltage divider between said amplifier anode and said reference potential, said voltage divider having an intermediate point connected through a resistor with said positive source; a cathode ray display tube having a cathode and control grid elements; means connecting the tap of said contrast control potentiometer wtih the cathode of said display tube; and means connecting the tap of said brightness control potentiometer with the control grid of said display tube.

2. The contrast control circuit of claim 1 wherein said brightness control potentiometer is connected in the voltage divider between said point of stable operating potential and said reference potential.

3. The contrast control circuit of claim 1 wherein said brightness control potentiometer is connected in a voltage divider independent of said contrast control.

4. In a television receiver a direct current coupled contrast control circuit of the character described, comprising: a video amplifier having a cathode, control grid and anode electrodes; means establishing a reference potential; a source of operating potential positive with respect to said reference potential; means including an anode load connecting the anode-cathode circuit of said video amplifier between said source of operating potential and said reference potential means; a voltage divider connected between said source of operating potential and said reference potential, having an intermediate point providing a stable operating potential less than the potential of said source; a video contrast control potentiometer having a resistor portion connected between said anode and said intermediate point; means connecting the tap of said contrast control potentiometer with a picture display device; a brightness control potentiometer having a resistor portion forming a part of said voltage divider and connected between said intermediate point and said reference potential means; and means connecting the tap of said brightness control potentiometer with said picture display device.

5. In a television receiver, a direct current coupled contrast control circuit of the character described, comprising: a video amplifier having cathode, control grid and anode electrodes; means establishing a reference potential; a source of operating potential positive with respect to said reference potential; means including an anode load resistor connecting the anode-cathode circuit of said video amplifier between said source of operating potential and said reference potential; a source of video signal connected with said control grid; a voltage divider connected between said source of operating potential and said reference potential, having an intermediate point providing a stable operating potential less than the potential of said source, said voltage divider including a second resistor connected between said intermediate point and said source of operating potential and a brightness control potentiometer having a resistor portion connected between said intermediate point and said reference potential; means, including the resistor portion of a video contrast control potentiometer connected between the anode of said amplifier and said intermediate point; a cathode ray display tube having cathode and control grid elements; means connecting the tap of said contrast control potentiometer with the cathode of said display tube; and means connecting the tap of said brightness control potentiometer with the control grid of said display tube.

References Cited by the Examiner

UNITED STATES PATENTS

| | | | |
|---|---|---|---|
| 2,988,594 | 6/61 | Stroh | 178—7.3 |
| 3,051,780 | 8/62 | Trost | 178—7.5 |

OTHER REFERENCES

Television Engineering Handbook, Donald Fink, Ed. First Edition, McGraw-Hill, 1957, pages 16–112 and 16–113 relied on.

Television for Radiomen, Edward M. Noll, Revised Edition, MacMillan, 1955, pages 144–145 relied on.

DAVID G. REDINBAUGH, *Primary Examiner.*